United States Patent
Bellizia et al.

(10) Patent No.: US 11,243,779 B2
(45) Date of Patent: Feb. 8, 2022

(54) SYSTEM AND METHOD FOR MANAGING EXECUTION OF PROCESSES ON A CLUSTER OF PROCESSING DEVICES

(71) Applicant: HCL Technologies Italy S.p.A, Vimodrone (IT)

(72) Inventors: Valerio Bellizia, Rome (IT); Andrea Cedraro, Rome (IT)

(73) Assignee: HCL Technologies Italy SpA, Milan (IT)

(*) Notice: Subject to any disclaimer, the term of this patent is extended or adjusted under 35 U.S.C. 154(b) by 71 days.

(21) Appl. No.: 16/457,741

(22) Filed: Jun. 28, 2019

(65) Prior Publication Data

US 2020/0409718 A1    Dec. 31, 2020

(51) Int. Cl.
| | |
|---|---|
| G06F 9/30 | (2018.01) |
| G06F 9/38 | (2018.01) |
| G06F 12/02 | (2006.01) |
| G06F 9/50 | (2006.01) |
| G06F 9/355 | (2018.01) |

(52) U.S. Cl.
CPC .......... *G06F 9/3891* (2013.01); *G06F 9/3555* (2013.01); *G06F 9/5016* (2013.01); *G06F 12/0238* (2013.01)

(58) Field of Classification Search
None
See application file for complete search history.

(56) References Cited

U.S. PATENT DOCUMENTS

| | | | |
|---|---|---|---|
| 5,809,564 A * | 9/1998 | Craze | G06F 12/023 711/208 |
| 6,023,712 A | 2/2000 | Spear et al. | |
| 6,941,437 B2 | 9/2005 | Cook et al. | |
| 7,596,790 B2 * | 9/2009 | Moakley | G06F 9/45533 709/201 |
| 8,166,171 B2 * | 4/2012 | Murray | G06F 9/5061 709/202 |
| 2013/0159376 A1 | 6/2013 | Charles | |
| 2019/0114254 A1 * | 4/2019 | Memon | G06F 9/4411 |

* cited by examiner

*Primary Examiner* — Corey S Faherty
(74) *Attorney, Agent, or Firm* — Kendal Sheets

(57) ABSTRACT

Disclosed is a method and system for managing execution of processes on a cluster of processing devices by a supervising device. The method comprises receiving memory consumption information from each of a processing devices executing a plurality of processes. The method further comprises receiving information related to swapping of a new process from at least one processing device of the processing devices while memory available on the at least one processing device is insufficient to execute the new process. The method further comprises terminating either the new process being swapped or a process executing on the at least one processing device. The method further comprises instructing another processing device having sufficient memory available for execution of the new process being swapped or the process executing on the at least one processing device, whichever is terminated on the at least one processing device.

11 Claims, 2 Drawing Sheets

SYSTEM AND METHOD FOR MANAGING EXECUTION OF PROCESSES ON A CLUSTER OF PROCESSING DEVICES

TECHNICAL FIELD OF DISCLOSURE

The present subject matter described herein, in general, relates to managing execution of processes on a cluster of processing devices present in a distributed computed environment.

BACKGROUND

Random Access Memory (RAM) is a primary memory used by a processing device such as a server to process installed applications. The number of applications and memory consumption by the applications, generally present in the memory of the processing devices, have been identified to be increasing over the time. Such increase in memory consumption is caused due to several technical and non-technical reasons such as data flows and memory leaks.

Memory fragmentation is another challenge that every processing device eventually faces, irrespective of the size of RAM available with the processing device. Memory fragmentation issues arise whenever a process demands a memory block whose size is bigger than a maximum contiguous free block available. To tackle the problem of memory fragmentation, memory virtualization is a technique implemented by operating systems. By memory virtualization, a designated zone of Hard Disk Drives (HDDs) called "swap" is used as an extension of the primary memory i.e. the RAM. There also remains a problem associated with the technique of memory virtualization, and that includes operational speed of the HDDs. Operation on the HDDs are extremely slower compared to RAM, and this significantly degrades overall performance of the processing device.

Current attempts to overcome such problems have been made at Operating System (OS) levels only. The OS is designed to effectively utilize the memory of a processing device. Despite making the changes at the OS level, physical memory management poses a challenge. Therefore, there remains a need to manage the requirement of physical memories i.e. RAMS required for executing applications on processing devices, and to overcome the problem of memory fragmentation.

OBJECTIVES OF THE INVENTION

It is an objective of the invention to provide a system and a method for managing execution of processes on a cluster of processing devices present in a distributed environment.

It is another objective of the invention to implement the system and the method on a framework capable of horizontal scaling.

It is yet another objective of the invention to overcome the problem of memory segmentation.

SUMMARY

Before the present systems and methods for managing execution of processes on a cluster of processing devices, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular implementations or versions or embodiments only, and is not intended to limit the scope of the present application. This summary is provided to introduce aspects related to a system and a method for managing execution of processes on a cluster of processing devices. This summary is not intended to identify essential features of the claimed subject matter nor is it intended for use in determining or limiting the scope of the claimed subject matter.

In one implementation, a method for managing execution of processes on a cluster of processing devices is disclosed. The method may be executed on a supervising device. In one aspect, the method may comprise receiving memory consumption information from each of the processing devices executing a plurality of processes. The method may further comprise receiving information related to swapping of a new process from at least one processing device of the processing devices while memory available on the at least one processing device is insufficient to execute the new process. The method may further comprise terminating either the new process being swapped or a process executing on the at least one processing device. The method may further comprise instructing another processing device having sufficient memory available for execution of the new process being swapped or the process executing on the at least one processing device, whichever is terminated on the at least one processing device.

In another implementation, a system for managing execution of processes on a cluster of processing devices is disclosed. The system comprises a supervising device and a cluster of processing devices. The supervising device may be connected to the cluster of processing devices to perform a series of steps. In the aspect, the system may receive memory consumption information from each of the processing devices executing a plurality of processes. The system may further receive information related to swapping of a new process from at least one processing device of the processing devices while memory available on the at least one processing device is insufficient to execute the new process. The system may further terminate either the new process being swapped or a process executing on the at least one processing device. The system may further instruct another processing device having sufficient memory available for execution of the new process being swapped or the process executing on the at least one processing device, whichever is terminated on the at least one processing device.

In yet another implementation, non-transitory computer readable medium embodying a program executable in a computing device for managing execution of processes on a cluster of processing devices is disclosed. In one aspect, the program may comprise a program code for receiving memory consumption information from each of the processing devices executing a plurality of processes. The program may further comprise a program code for receiving information related to swapping of a new process from at least one processing device of the processing devices while memory available on the at least one processing device is insufficient to execute the new process. The program may further comprise a program code for terminating either the new process being swapped or a process executing on the at least one processing device. The program may further comprise a program code for instructing another processing device having sufficient memory available for execution of the new process being swapped or the process executing on the at least one processing device, whichever is terminated on the at least one processing device.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system for managing execution of processes on a cluster of processing devices disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods for managing execution of processes on a cluster of processing devices, similar or equivalent to those described herein can be used in the practice or testing of embodiments of the present disclosure, the exemplary, systems and methods for managing execution of processes on a cluster of processing devices are now described. The disclosed embodiments are merely examples of the disclosure, which may be embodied in various forms.

Various modifications to the embodiment will be readily apparent to those skilled in the art and the generic principles herein may be applied to other embodiments for managing execution of processes on a cluster of processing devices. However, one of ordinary skill in the art will readily recognize that the present disclosure for managing execution of processes on a cluster of processing devices is not intended to be limited to the embodiments described, but is to be accorded the widest scope consistent with the principles and features described herein.

In an implementation, a system and method for managing execution of processes on a cluster of processing devices are described. The system and the method allows receiving memory consumption information from each of the processing devices executing a plurality of processes. Thereupon, information related to swapping of a new process from at least one processing device of the processing devices may be received while memory available on the at least one processing device is insufficient to execute the new process. Successively, either the new process being swapped or a process executing on the at least one processing device may be terminated. Finally, another processing device having a sufficient memory available may be instructed for executing the new process being swapped or the process executing on the at least one processing device, whichever is terminated on the at least one processing device.

Figure 1:
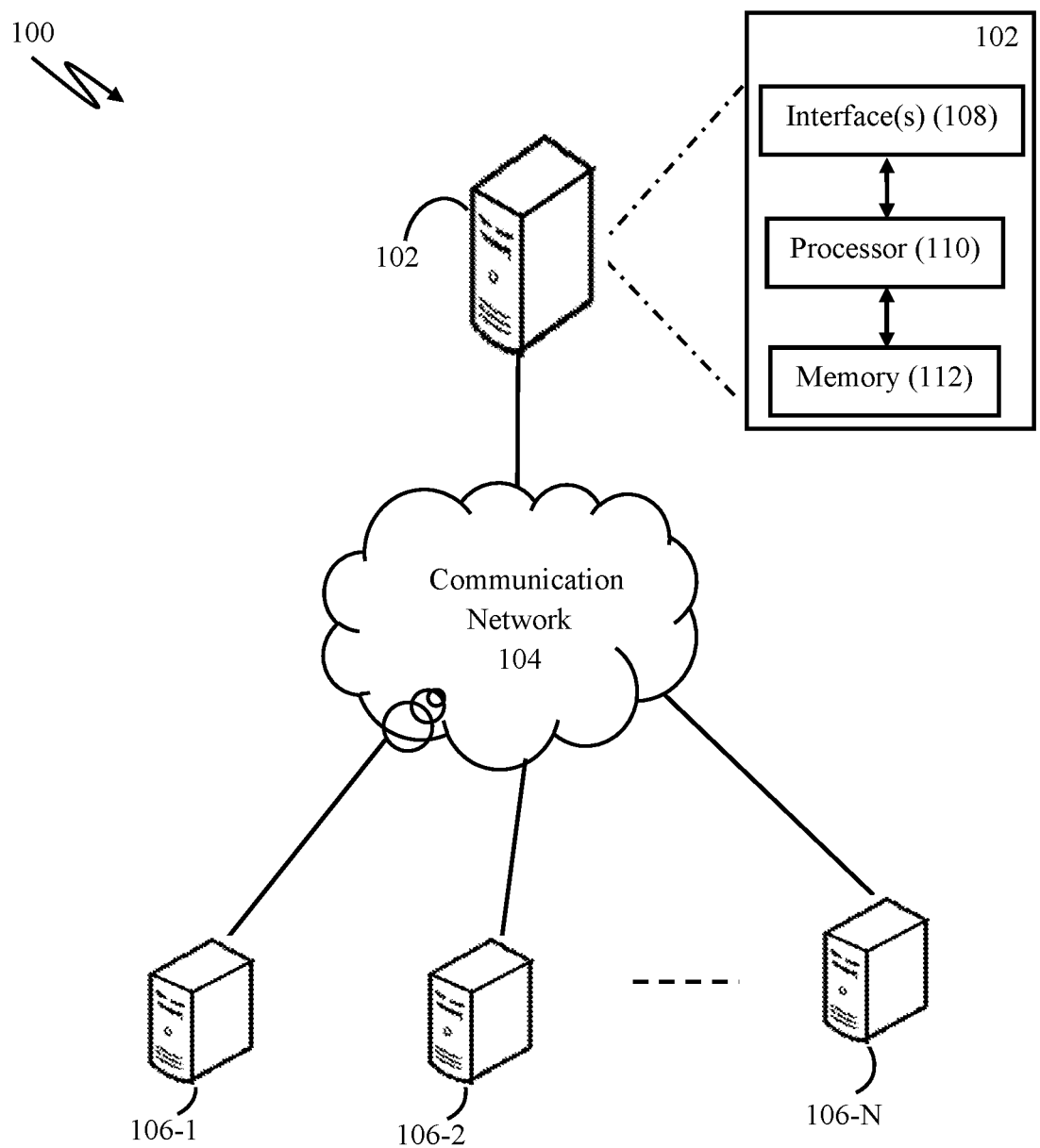
FIG. 1 illustrates a network implementation diagram of a system 100 for managing execution of processes on a cluster of processing devices, in accordance with an embodiment of the present subject matter.

Referring now to FIG. 1, a network implementation diagram 100 of a system 102 for managing execution of processes on a cluster of processing devices, in accordance with an embodiment of the present subject matter may be described. In one example, the system 102 may be implemented as a standalone system 102 connected to a communication network 104.

It may be understood that the system 102 may also be implemented in a variety of computing systems, such as a laptop computer, a desktop computer, a notebook, a workstation, a mainframe computer, a server, a network server, a cloud-based computing environment, and the like. It will also be understood that the system 102 may be connected with other processing devices 106-1 through 106-N (collectively referred as the processing devices 106) through the communication network 104. The processing device 106 may be configured to execute a plurality of processes.

In one implementation, the communication network 104 may be a wireless network, a wired network, or a combination thereof. The communication network 104 can be implemented as one of the different types of networks, such as intranet, Local Area Network (LAN), Wireless Personal Area Network (WPAN), Wireless Local Area Network (WLAN), wide area network (WAN), the internet, and the like. The communication network 104 may either be a dedicated network or a shared network. The shared network represents an association of the different types of networks that use a variety of protocols, for example, MQ Telemetry Transport (MQTT), Extensible Messaging and Presence Protocol (XMPP), Hypertext Transfer Protocol (HTTP), Transmission Control Protocol/Internet Protocol (TCP/IP), Wireless Application Protocol (WAP), and the like, to communicate with one another. Further, the communication network 104 may include a variety of network devices, including routers, bridges, servers, computing devices, storage devices, and the like.

In one embodiment, the system 102 may include an input/output (I/O) interface 108, at least one processor 110, and a memory 112. The I/O interface 108 may include a variety of software and hardware interfaces, for example, a web interface, a graphical user interface, and the like. The I/O interface 108 may allow an administrator or a programmer to interact with the system 102. Further, the I/O interface 108 may enable the system 102 to communicate with other computing devices, such as web servers and external data servers (not shown). The I/O interface 108 can facilitate multiple communications within a wide variety of networks and protocol types, including wired networks, for example, LAN, cable, etc., and wireless networks, such as WLAN, cellular, or satellite. The I/O interface 108 may include one or more ports for connecting a number of devices to one another or to another server.

The at least one processor 110 may be implemented as one or more microprocessors, microcomputers, microcontrollers, digital signal processors, central processing units, state machines, logic circuitries, and/or any devices that manipulate signals based on operational instructions. Among other capabilities, the at least one processor 110 may be configured to fetch and execute computer-readable instructions stored in the memory 112.

The memory 112 may include any computer-readable medium or computer program product known in the art including, for example, volatile memory, such as Static Random Access Memory (SRAM) and Dynamic Random Access Memory (DRAM), and/or non-volatile memory, such as Read Only Memory (ROM), Erasable Programmable ROM (EPROM), Electrically Erasable and Programmable ROM (EEPROM), flash memories, hard disks, optical disks, and magnetic tapes. The memory 112 may be used for data generated during processing by the system 102.

In one implementation, a plurality of processes executing on a cluster of processing devices may be managed. The cluster of processing devices may preferably run a framework capable of horizontal scaling, such as Node.js®. A method for managing the plurality of processes may be executed on the system 102, referred henceforth as a supervising device 102. The supervising device 102 may be one of the processing devices 106 or an external device connected to the processing devices 106.

In an embodiment, at first during operation, memory consumption information may be received from each of the processing devices 106. The memory consumption information may comprise total amount of memory, total free memory, biggest contiguous free memory block, and memory consumption by each process executing on the processing devices 106. The processing devices 106 may be executing the plurality of processes. In one case, the cluster may include 'N' processing devices running 'M' node processes, and 'M' may be greater than 'N.' Each of the processing devices 106 present within the cluster may run at least 1 node process.

In one embodiment, a new process may need to be executed on a processing device and the memory of the processing device may either be completely occupied or sufficient amount of free memory may not be available to execute the new process. The processing device may attempt to swap the new process, for execution, on a secondary memory such as hard disk, of the processing device. In such condition, information related to swapping of the new process may be received by the supervising device 102. The supervising device 102 may periodically receive such information from a monitoring application i.e. an agent running on the processing devices 106. Using such information received periodically from the processing devices 106, the supervising device 102 may maintain and update a global memory ledger.

Upon receiving the information related to swapping of the new process, the supervising device 102 may terminate either the new process being swapped or a process executing on the processing device. The process executing on the processing device may be selected based on its least importance and/or an amount of memory that would get freed up upon termination of the process. In one case, while the new process being swapped is terminated, the supervising device 102 may instruct another processing device having sufficient memory available, to execute the new process being swapped. In another case, while the process executing on the processing device is terminated, the supervising device 102 may instruct another processing device to execute the process. Another processing device may be selected based on the amount of free memory available with the processing devices 106.

Using the method and system described in above embodiments, it becomes possible to effectively utilize resources i.e. memories available in a cluster of processing devices present in a distributed environment. Using such methodology, memory available with a processing device may be utilized in cases when memory available with another processing is insufficient to execute a required application.

Figure 2:
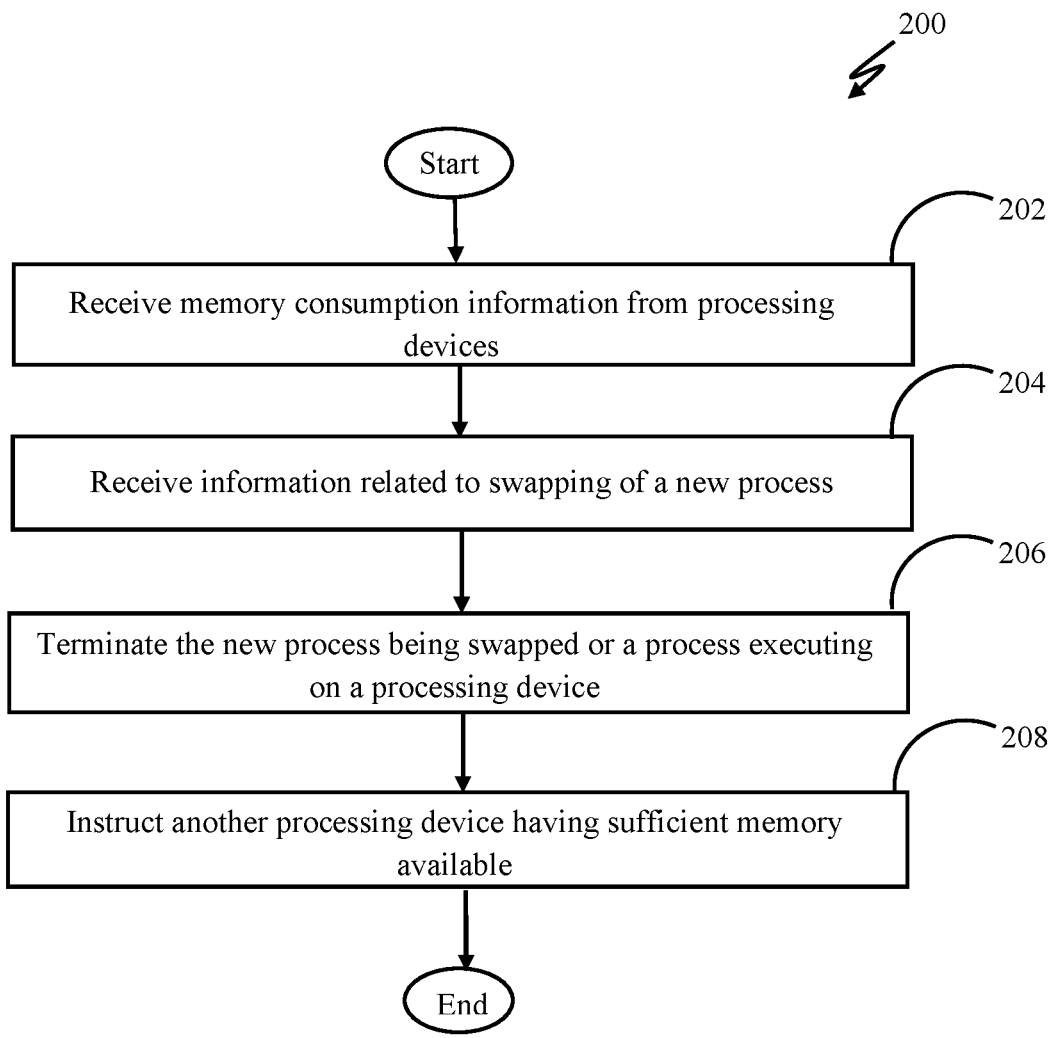
FIG. 2 illustrates a method 200 for managing execution of processes on a cluster of processing devices, in accordance with an embodiment of the present subject matter.

Referring now to FIG. 2, a method 200 for managing execution of processes on a cluster of processing devices is disclosed in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 for managing execution of processes on a cluster of processing devices is described is not intended to be construed as a limitation, and any number of the described method blocks can be combined in any order to implement the method 200 or alternate methods. Additionally, individual blocks may be deleted from the method 200 without departing from the spirit and scope of the subject matter described herein. Furthermore, the method can be implemented in any suitable hardware, software, firmware, or combination thereof. However, for ease of explanation, in the embodiments described below, the method 200 may be considered to be implemented in the above described supervising device 102.

At block 202, memory consumption information may be received from processing devices 106 executing a plurality of processes. The memory consumption information may be received by the supervising device 102, in one embodiment.

At block 204, information related to swapping of a new process may be received from a processing device of the processing devices 106 while memory available the processing device is insufficient to execute the new process. The information related to swapping of the new process may be received by the supervising device 102, in one embodiment.

At block 206, either the new process being swapped may be terminated or a process executing on the processing device may be terminated. Both the new process being swapped and the process executing on the processing device may be terminated based on instructions received from the supervising device 102, in one embodiment.

At block 208, instructions may be provided to another processing device having sufficient memory available for execution of the new process being swapped or the process executing on the processing device, whichever is terminated on the processing device. Such instruction may be provided by the supervising device 102, in one embodiment.

Although implementations for methods and systems for managing execution of processes on a cluster of processing devices have been described in language specific to structural features and/or methods, it is to be understood that the appended claims are not necessarily limited to the specific features or methods described. Rather, the specific features and methods are disclosed as examples of implementations for managing execution of processes on a cluster of processing devices.

The invention claimed is:

1. A method for managing execution of processes on a cluster of processing devices, the method being executed on a supervising device, the method comprising:
   receiving memory consumption information from each of a processing devices executing a plurality of processes;
   receiving information related to swapping of a new process from at least one processing device of the processing devices while memory available on the at least one processing device is insufficient to execute the new process, wherein the at least one processing device is a supervising device periodically receiving information from a monitoring application;

terminating through the supervising device, either the new process being swapped or a process executing on the at least one processing device based on memory consumption information; and instructing through the supervising device to another processing device having sufficient memory available for execution of the new process being swapped to execute the new process being swapped, whichever is terminated on the at least one processing device.

2. The method as claimed in claim 1, wherein the cluster of processing devices runs a framework capable of horizontal scaling.

3. The method as claimed in claim 1, wherein the supervising device is one of the processing devices.

4. The method as claimed in claim 1, wherein the supervising device is an external processing device connected to the cluster of processing devices.

5. The method as claimed in claim 1, wherein the memory consumption information comprises total amount of memory, total free memory, biggest contiguous free memory block, and memory consumption by each process executing on the processing devices.

6. A system for managing execution of processes on a cluster of processing devices, the system comprising:

a supervising device connected to the cluster of processing devices, to perform the steps of:

receiving memory consumption information from each of a processing devices executing a plurality of processes;

receiving information related to swapping of a new process from at least one processing device of the processing devices while memory available on the at least one processing device is insufficient to execute the new process, wherein the at least one processing device is a supervising device periodically receiving information from a monitoring application;

terminating through the supervising device either the new process being swapped or a process executing on the at least one processing device based on memory consumption information; and instructing through the supervising device to another processing device having sufficient memory available for execution of the new process being swapped to execute the new process being swapped, whichever is terminated on the at least one processing device.

7. The system as claimed in claim 6, wherein the cluster of processing devices runs a framework capable of horizontal scaling.

8. The system as claimed in claim 6, wherein the supervising device is one of the processing devices.

9. The system as claimed in claim 6, wherein the supervising device is an external processing device connected to the cluster of processing devices.

10. The system as claimed in claim 6, wherein the memory consumption information comprises total amount of memory, total free memory, biggest contiguous free memory block, and memory consumption by each process executing on the processing devices.

11. A non-transitory computer program product having embodied thereon a computer program for managing execution of processes on a cluster of processing devices, the computer program product storing instructions for:

receiving memory consumption information from each of a processing devices executing a plurality of processes;

receiving information related to swapping of a new process from at least one processing device of the processing devices while memory available on the at least one processing device is insufficient to execute the new process, wherein the processing device is a supervising device periodically receiving information from a monitoring application;

terminating through the supervising device either the new process being swapped or a process executing on the at least one processing device based on memory consumption information; and instructing through the supervising device to another processing device having sufficient memory available for execution of the new process being swapped to execute the new process being swapped, whichever is terminated on the at least one processing device.

* * * * *